US012079635B2

(12) United States Patent
Hahn et al.

(10) Patent No.: US 12,079,635 B2
(45) Date of Patent: Sep. 3, 2024

(54) DATA STORAGE DEVICE AND METHOD FOR STORAGE-CLASS-MEMORY-ACCELERATED BOOT PARTITION OPTIMIZATION

(71) Applicant: Western Digital Technologies, Inc., San Jose, CA (US)

(72) Inventors: Judah Gamliel Hahn, Ofra (IL); Shay Benisty, Beer Sheva (IL); Alexander Bazarsky, Holon (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 101 days.

(21) Appl. No.: 17/752,264

(22) Filed: May 24, 2022

(65) Prior Publication Data

US 2023/0385068 A1   Nov. 30, 2023

(51) Int. Cl.
*G06F 9/4401* (2018.01)
*G06F 9/50* (2006.01)

(52) U.S. Cl.
CPC .......... *G06F 9/4403* (2013.01); *G06F 9/4406* (2013.01); *G06F 9/4408* (2013.01); *G06F 9/441* (2013.01); *G06F 9/5016* (2013.01); *G06F 9/505* (2013.01); *G06F 9/5061* (2013.01)

(58) Field of Classification Search
CPC .... G06F 9/4403; G06F 9/4406; G06F 9/4408; G06F 9/441; G06F 9/5016; G06F 9/505; G06F 9/5061
See application file for complete search history.

(56) References Cited

U.S. PATENT DOCUMENTS

| | | | |
|---|---|---|---|
| 7,487,343 B1* | 2/2009 | Insley | G06F 9/441 713/1 |
| 8,185,728 B2* | 5/2012 | Lee | G06F 9/44573 713/1 |
| 9,542,195 B1* | 1/2017 | Astarabadi | G06F 11/1469 |
| 2004/0153724 A1* | 8/2004 | Nicholson | G06F 11/0709 714/E11.133 |
| 2005/0251673 A1* | 11/2005 | Bosley | G06F 11/1433 714/E11.135 |
| 2005/0273588 A1* | 12/2005 | Ong | G06F 11/1417 713/2 |
| 2008/0040596 A1* | 2/2008 | Mai | G06F 9/4403 713/2 |
| 2015/0143095 A1* | 5/2015 | Maity | G06F 11/1417 713/2 |

(Continued)

*Primary Examiner* — Glenn A. Auve
(74) *Attorney, Agent, or Firm* — Crowell & Moring LLP (57) ABSTRACT

A data storage device comprises a first memory, a second memory, and a controller. The first memory has a faster access time than the second memory. The controller is configured to store host-initialization code in the first memory, store a copy of the host-initialization code in the second memory, determine that the copy of the host-initialization code should be designated as the main version of the host-initialization code, and relocate the copy of the host-initialization code to the first memory, which makes the copy of the host-initialization code the main version of the host-initialization code that is accessed to boot-up the host. Other embodiments are possible, and each of the embodiments can be used alone or together in combination.

20 Claims, 8 Drawing Sheets

(56) References Cited

U.S. PATENT DOCUMENTS

| | | | |
|---|---|---|---|
| 2015/0143172 A1* | 5/2015 | Huang | G06F 11/2284 |
| | | | 714/15 |
| 2018/0088962 A1* | 3/2018 | Balakrishnan | G06F 11/0757 |
| 2021/0157921 A1* | 5/2021 | Brown | G06F 21/575 |
| 2021/0240488 A1* | 8/2021 | Suryanarayana | G06F 9/4406 |
| 2021/0240567 A1* | 8/2021 | Hsu | G06F 13/4282 |
| 2021/0263746 A1* | 8/2021 | Thom | G06F 3/0685 |
| 2022/0179746 A1* | 6/2022 | Lin | G06F 11/3692 |
| 2023/0273798 A1* | 8/2023 | Umimura | G06F 9/441 |
| | | | 713/2 |

* cited by examiner

DATA STORAGE DEVICE AND METHOD FOR STORAGE-CLASS-MEMORY-ACCELERATED BOOT PARTITION OPTIMIZATION

BACKGROUND

A host can use a data storage device for storage and retrieve of user data. Some hosts also use a data storage device in the process of booting the host. For example, the data storage device can have a boot partition storing a bootloader that can be read by the host without the host initializing queues or enabling the controller of the data storage device. The data storage device can have two boot partitions, which allows the host to update one of the boot partitions and verify its content before marking it as active.

DETAILED DESCRIPTION

Overview

By way of introduction, the below embodiments relate to a data storage device and method for storage-class-memory-accelerated boot partition optimization. In one embodiment, a data storage device is provided comprising a first memory, a second memory, and a controller. The first memory has a faster access time than the second memory. The controller is configured to: store host-initialization code in the first memory, wherein by being stored in the first memory, the host-initialization code is a main version of the host-initialization code that is accessed to boot-up a host; store a copy of the host-initialization code in the second memory, wherein by being stored in the second memory, the copy of the host-initialization code is a backup version of the host-initialization code; determine that the copy of the host-initialization code should be designated as the main version of the host-initialization code; and relocate the copy of the host-initialization code to the first memory, which makes the copy of the host-initialization code the main version of the host-initialization code that is accessed to boot-up the host.

In some embodiments, the first memory comprises a storage class memory and the second memory comprises NAND memory.

In some embodiments, the host-initialization code is stored in a boot partition in the first memory and the copy of the host-initialization code is stored in a boot partition in the second memory.

In some embodiments, the controller is further configured to determine that the copy of the host-initialization code should be designated as the main version in response to an instruction from the host.

In some embodiments, the controller is further configured to determine that the copy of the host-initialization code should be designated as the main version in response to determining that the copy of the host-initialization code had been modified In some embodiments, the controller is further configured to: determine an urgency to relocate the copy of host-initialization code to the first memory; and schedule relocation of the copy of host-initialization code to the first memory based on the urgency.

In some embodiments, the urgency is based on a workload of the data storage device.

In some embodiments, the urgency is based on an indication received from the host.

In some embodiments, the urgency is based on past experience of the controller.

In some embodiments, the controller is further configured to relocate the copy of host-initialization code to the first memory as a background operation.

In some embodiments, the second memory comprises a three-dimensional memory.

In another embodiment, a method is provided that is performed in a data storage device comprising a storage class memory with a boot partition storing a first version of host boot code and a NAND memory with a boot partition storing a second version of the host boot code. The method comprising determining that the second version of the host boot code should be used instead of the first version of the host boot code to boot-up a host; scheduling a time to move the second version of the host boot code to the storage class memory; and moving the second version of the host boot code to the storage class memory at a scheduled time.

In some embodiments, the method further comprises receiving a command from the host that indicates that the second version of the host boot code should be used instead of the first version of the host boot code to boot-up the host.

In some embodiments, the method further comprises predicting that the second version of the host boot code should be used instead of the first version of the host boot code to boot-up the host in response to a change the host makes to the second version of the host boot code.

In some embodiments, the scheduled time is based on a workload of the data storage device.

In some embodiments, the scheduled time is based on an indication received from the host.

In some embodiments, the scheduled time is based on past experience of the data storage device.

In some embodiments, the scheduled time is based on urgency.

In some embodiments, the moving is done as a background operation.

In another embodiment, a data storage device is provided comprising a relatively-faster memory, a relatively-slower memory, and means for dynamically swapping boot code stored a boot partition in the relatively-slower memory to a boot partition in the relatively-faster memory so that the boot code is accessible to boot-up a host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
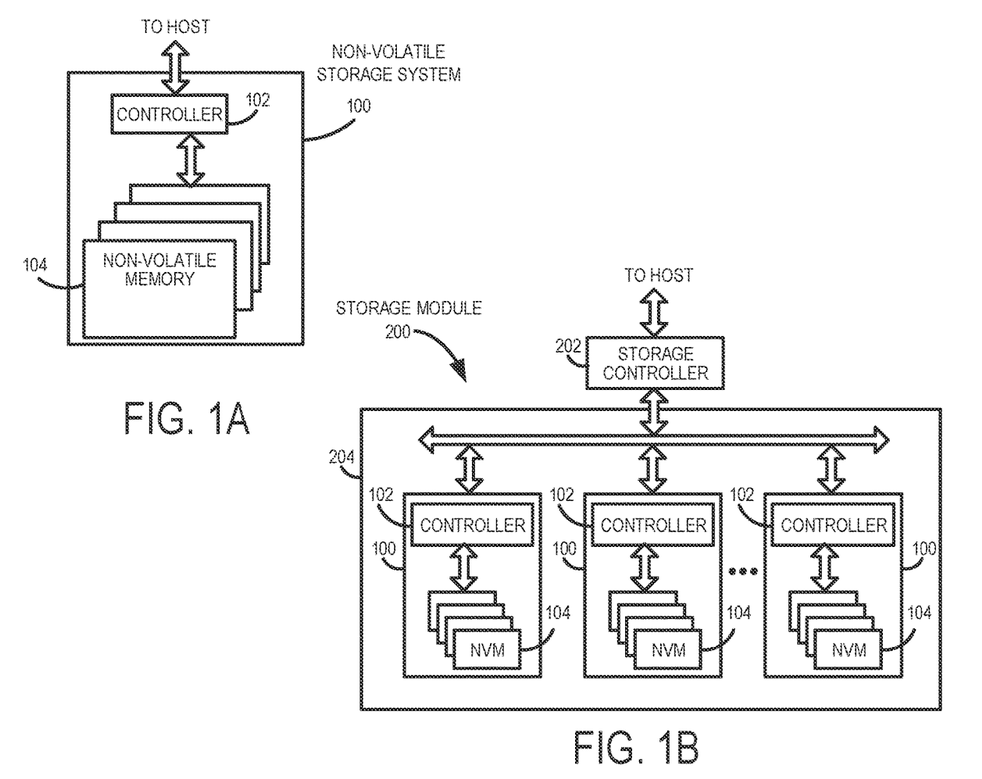
FIG. 1A is a block diagram of a data storage device of an embodiment.
FIG. 1B is a block diagram illustrating a storage module of an embodiment.
Figure 1C:
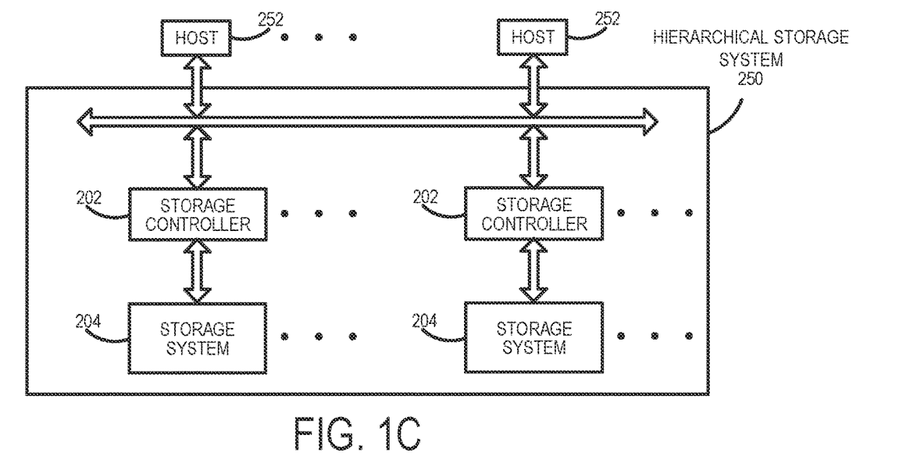
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (such as triple-level cells (TLC), quad-level cells (QLC), etc.), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
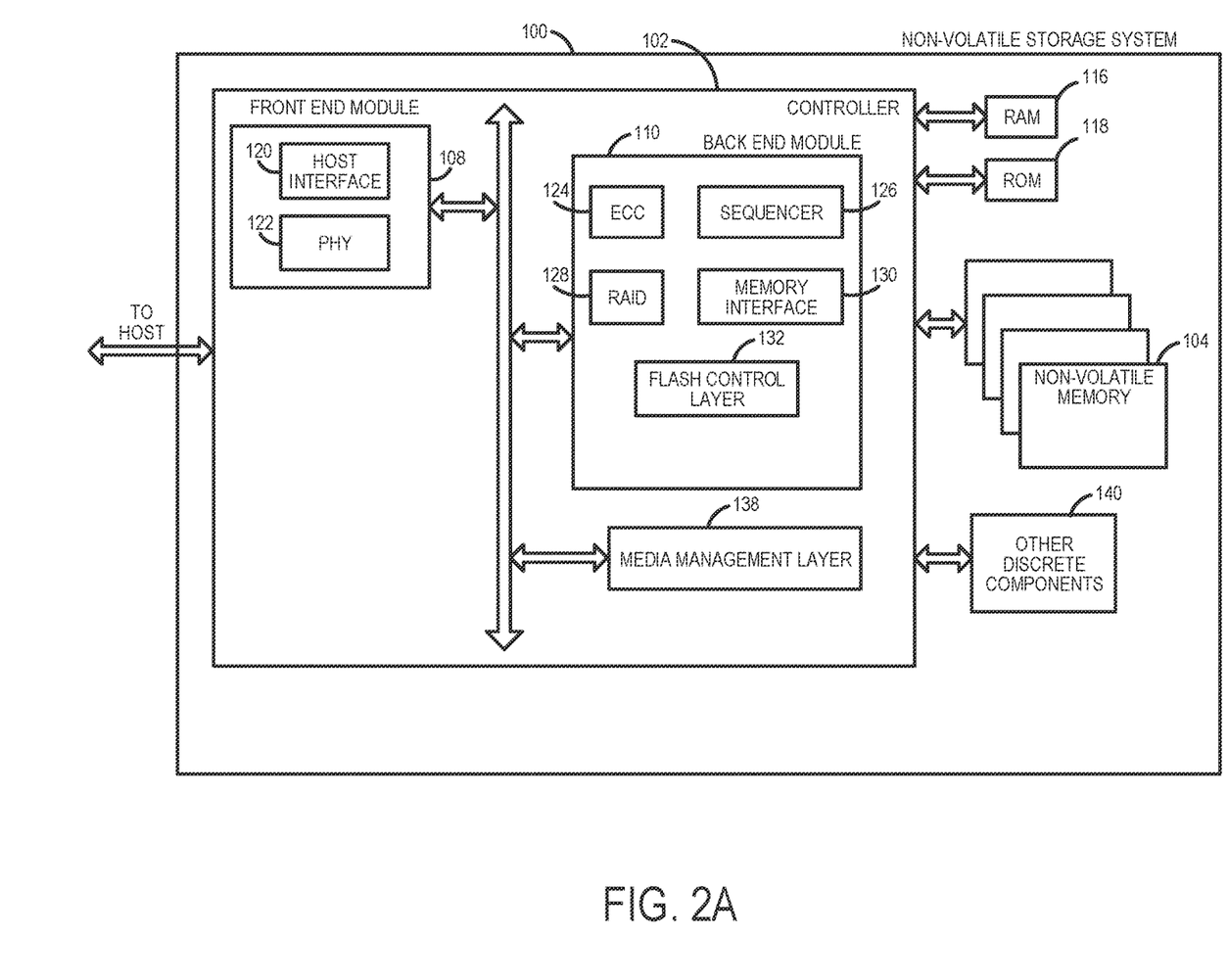
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
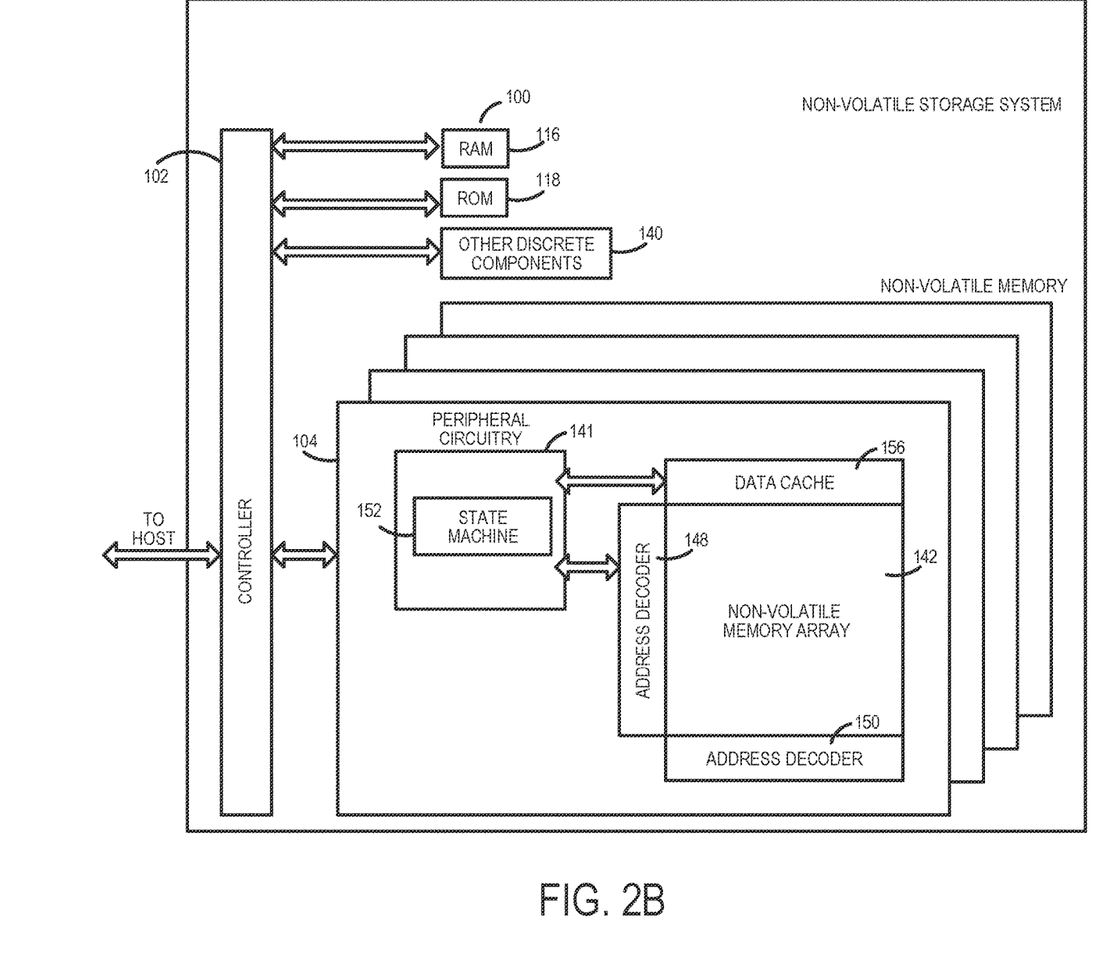
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
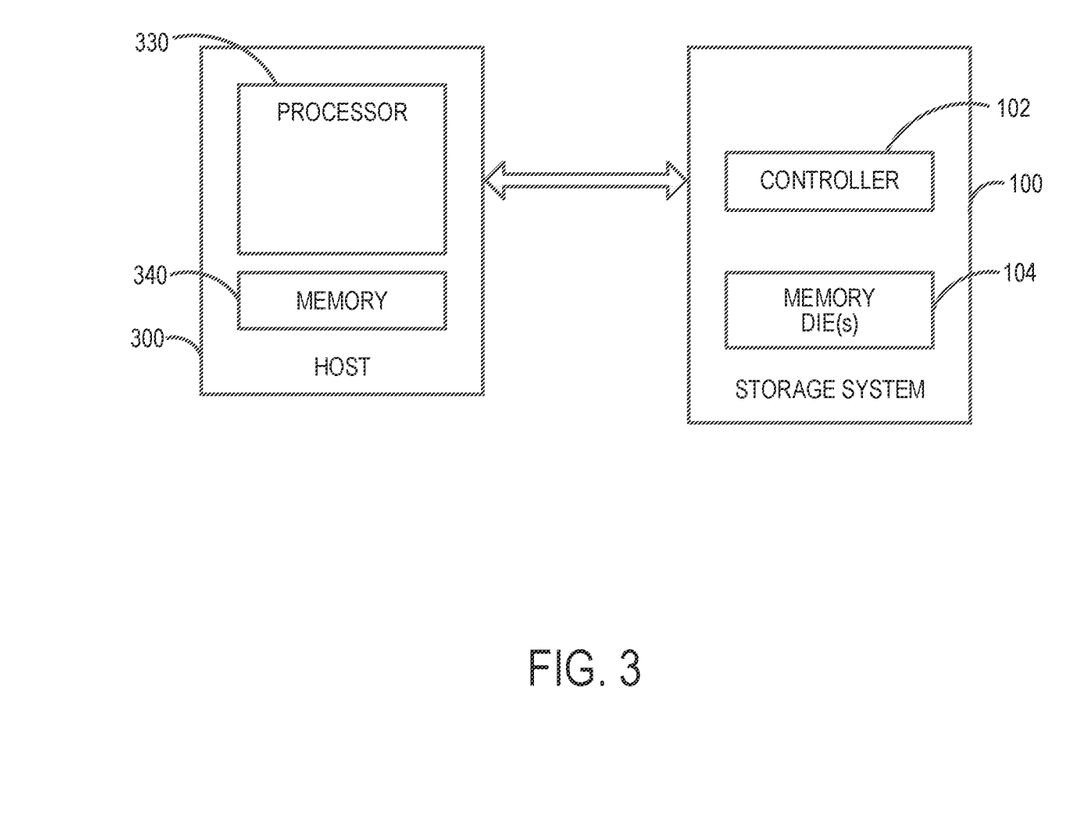
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, boot partitions can provide an optional area of non-volatile memory storage that may be read by a host without the host initializing queues or enabling the controller of the data storage device. The simplified interface to access boot partitions may be used for host platform initialization code (e.g., a bootloader that is executed from host read-only memory (ROM)) to boot to a pre-operating-system (OS) environment (e.g., a Unified Extensible Firmware Interface (UEFI)) instead of storing the image on another storage medium (e.g., a serial peripheral interface (SPI) flash). The contents of a boot partition can contain information used to initially or at least partially boot-up the host (e.g., host initialization code, host boot code, a bootloader, initialization files, etc.).

Figure 4:
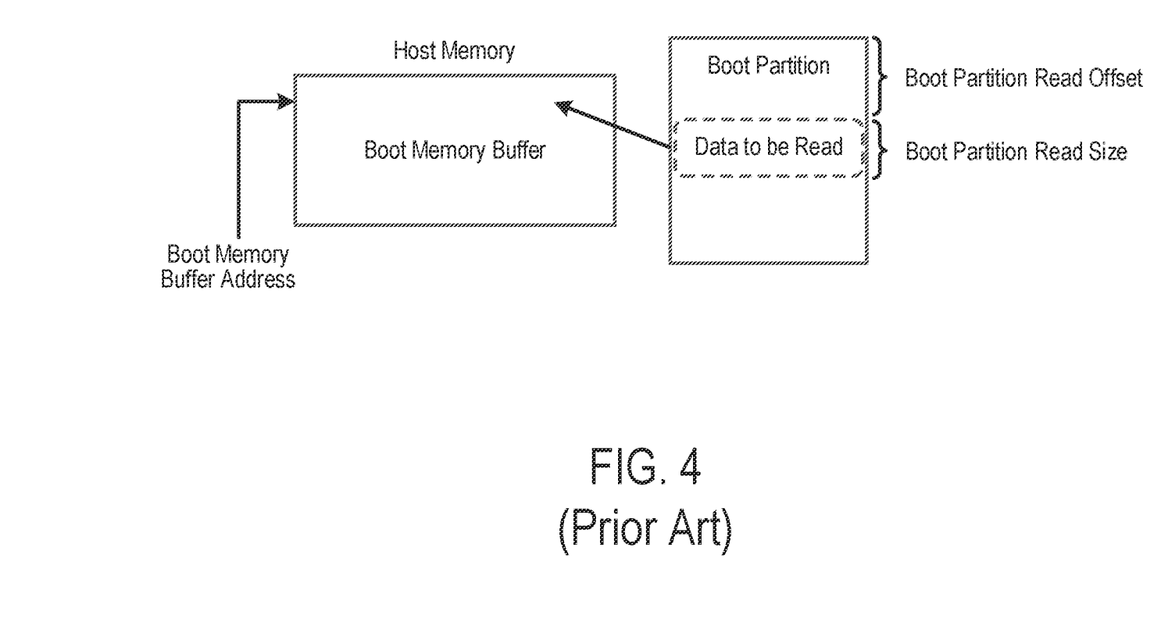
FIG. 4 is an illustration of a prior art boot partition.

According to section 8.2.1 of the NVMe standard, a boot partition is a continuous block of boot code data that the host may read via NVMe properties. As shown in FIG. 4, a boot partition can comprise a boot partition read offset and a boot partition read size. Data to be read is stored in a boot memory buffer in host memory. To read the contents of a boot partition using NVMe properties, the host allocates a boot partition memory buffer in host memory for the data storage device's controller to copy content from the boot partition. The host initializes the boot partition memory buffer base address and sets the boot partition identifier (ID), boot partition read size, and boot partition read offset to initiate the boot partition read operation. The host may continue reading from the boot partition until the entire boot partition has been read.

A portion of the boot partition may be read by the host any time the non-volatile memory subsystem is powered (i.e., whether or not CC.EN is set to "1"). In one implementation, the host does not modify transport specific properties (described in the applicable NVMe transport-binding specification), reset, or shutdown the controller while a boot partition read is in progress. An NVMe controller that supports boot partitions can have two boot partitions of equal size using boot partition identifiers 0 h and 1 h. The two boot partitions allow the host to update one and verify the contents before marking the boot partition active. The two boot partition copies are usually similar to each other but not always identical.

In the following embodiments, a storage class memory (SCM) is used to accelerate the host boot through adapting the location of the NVMe boot partition. In one embodiment, storage class memory is a memory that includes dynamic random access memory (DRAM), NAND flash memory, and a power source to make the DRAM persistent when power is otherwise not provided (e.g., from the host). Other configurations of storage class memory are possible. Data is typically accessed faster from a storage class memory than from conventional NAND flash memory. Examples of storage class memory include, but are not limited to, PCM, MRAM, and ReRAM. Currently, storage class memory is faster but more expensive than NAND memory.

In one embodiment, the main boot partition is in the storage class memory and content of the secondary boot partition in the NAND memory can be swapped dynamically into the main boot partition to make that content the main boot code. Boot code in the storage class memory that was previously designed as the main boot code can be erased from the storage class memory or can remain in the storage class memory but not pointed to as the main/primary copy (so, it would not be used to boot the host). The content of the secondary boot partition can be made the main boot code, for example, when changes/modifications/updates are made to the content of the secondary boot partition or when there is some problem with the main boot code in the main boot partition. Using storage class memory to store the main boot code reduces boot latency because the storage class memory is already powered-up and there is no need to wait for the controller 102 to power up. Also, storing only the main version of the boot code in the storage class memory is a cost-effective use of the expensive storage class memory (the backup version of the boot code is stored in NAND in this embodiment).

The host 300 may indicate the main boot partition through a specific command. It is then expected that the main boot partition is the one that will be read in the mainstream, while the secondary partition will serve as back up and may turn to the main partition when the host 300 decides to change some element in the boot sequence. In one embodiment, the main boot partition will reside in the storage class memory. When the host 300 decides to switch it to the secondary partition, the controller 102 of the data storage device 100 will schedule an operation to replace the storage-class-memory-based boot partition to the secondary partition (relocation). That is, the modified host boot code stored in the NAND memory is moved to the storage class memory and designated to be used instead of the other copy (e.g., the other copy in storage class memory can be deleted or just not pointed to). (Relocate can be a move or copy operation, where the version of the boot code in the NAND is removed or remains but is not pointed to.) The urgency of the relocation operation may depend on the current workload and either host indication of urgency or past experience of how long it takes for the host 300 to initiate the boot sequence after such switching.

Figure 5:
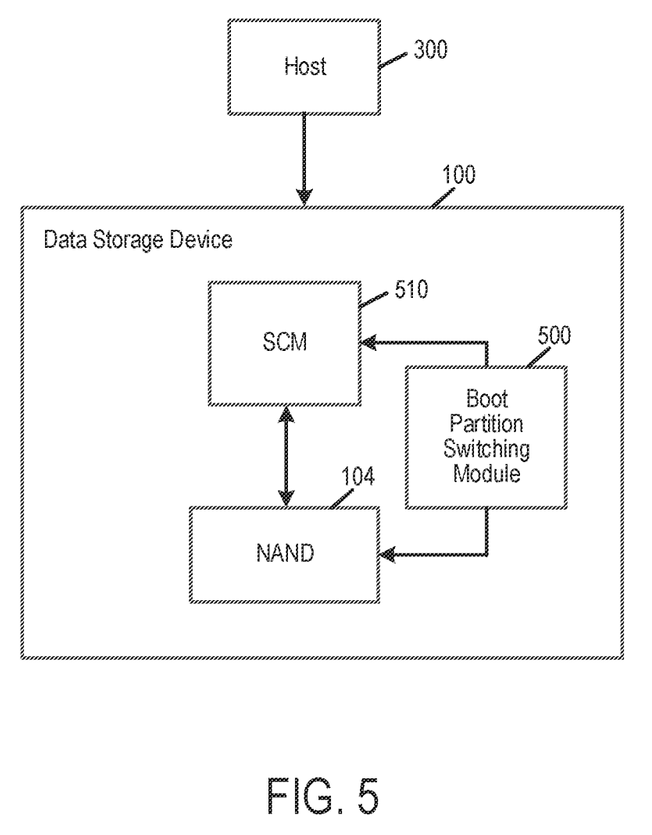
FIG. 5 is a block diagram of a host and data storage device of an embodiment.

FIG. 5 is a block diagram showing some of the components that can be used in this operation. As shown in FIG. 5, the data storage device 100 comprises NAND memory 104, storage class memory (SCM) 510, and a boot partition switching (BSM) 500, which can be implemented in the controller 102. Fewer/additional/different components can be used. While storage class memory and NAND are used in this example, it should be understood that these embodiments can be used with any two different memory types (not just storage class memory and NAND).

Figure 6:
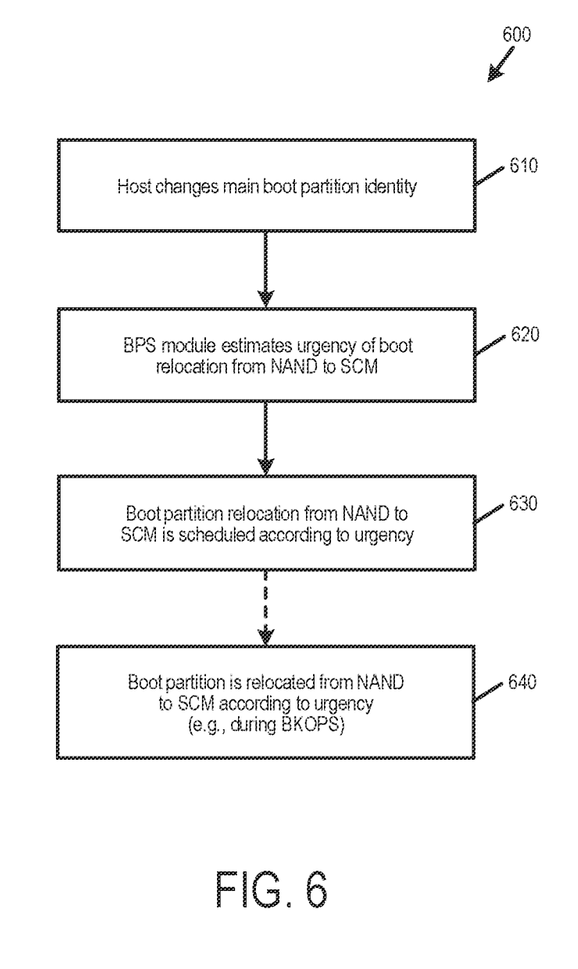
FIG. 6 is a flow chart of a method performed by a boot partition switching (BPS) module of an embodiment.

FIG. 6 is a flow chart 600 that illustrates the process of relocating the boot partition from NAND 104 to storage class memory 510 upon receiving a host command indicating that the main boot partition identity was switched. As shown in FIG. 6, in this embodiment, the host 300 changes the main boot partition identity (act 610). The BPS module 500 then estimates the urgency of boot relocation from the NAND 104 to the SCM 510 (act 620). Next, the boot partition relocation from the NAND 104 to the SCM 510 is scheduled according to urgency (act 630). Finally, the boot partition is relocated from the NAND 104 to the SCM 510 according to urgency (e.g., during background operations) (act 640). The urgency of this relocation may either be indicated by the host 500 through a dedicated command or derived by the controller 102 based on past operations. In addition, the scheduling of the relocation can be determined according to the current workload of the data storage device 100. For example, if the host 300 (or other hosts) issued a read-intensive workload, the scheduling of boot partition relocation may be delayed. This relocation can be done during background operations time (BKOPS).

Figure 7:
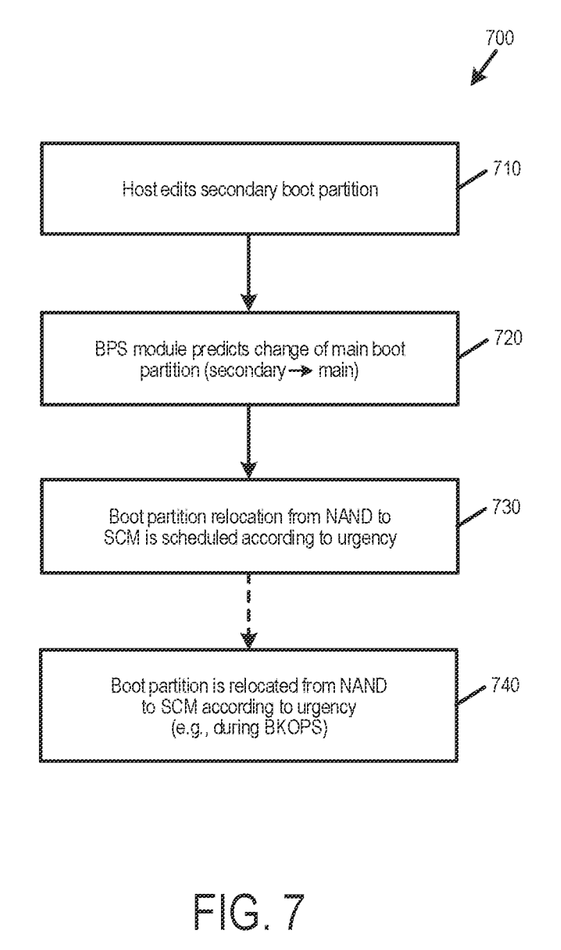
FIG. 7 is a flow chart of a predictive boot partition relocation method of an embodiment.

In another embodiment, the BPS module 500 can identify host edits of the secondary boot partition and predict the change of main boot partition identity. The BPS module 500 can use information from the past operation regarding the proximity of secondary boot partition edits and the switching of the main boot partition identity. Then, based on the results of the estimation whether the secondary partition will soon replace the main partition, it may be scheduled for relocation. This embodiment is illustrated in the flow chart 700 in FIG. 7. As shown in FIG. 7, the host 300 edits the secondary boot partition (act 710). Then, the BPS module 500 predicts a change of the main boot partition (e.g., secondary to main) (act 720). Next, the boot partition relocation from the NAND 104 to the SCM 510 is scheduled according to urgency (act 730). Finally, the boot partition is relocated from the NAND 104 to the SCM 510 according to urgency (e.g., during background operations) (act 740).

There are many advantages associated with these embodiments. For example, these embodiments can be used to reduce the host boot latency while investing the minimum effort by not storing both host boot copies in storage class memory. These embodiments can also be used to allow using TLC for secondary boot partition while today it is limited to SLC only in Embedded MultiMediaCard (eMMC) and Universal File System (UFS) devices. The SLC constraint limits the boot partition memory size. When moving to TLC, this limitation is removed.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a first memory;
a second memory, wherein the first memory has a faster access time than the second memory; and
a controller configured to:
store host-initialization code in the first memory, wherein by being stored in the first memory, the host-initialization code is a main version of the host-initialization code that is accessed to boot-up a host;
store a copy of the host-initialization code in the second memory, wherein by being stored in the second memory, the copy of the host-initialization code is a backup version of the host-initialization code;
determine that the copy of the host-initialization code should be designated as the main version of the host-initialization code; and
relocate the copy of the host-initialization code to the first memory as a background operation, which makes the copy of the host-initialization code the main version of the host-initialization code that is accessed to boot-up the host.

2. The data storage device of claim 1, wherein the first memory comprises a storage class memory and the second memory comprises NAND memory.

3. The data storage device of claim 1, wherein the host-initialization code is stored in a boot partition in the first memory and the copy of the host-initialization code is stored in a boot partition in the second memory.

4. The data storage device of claim 1, wherein the controller is further configured to determine that the copy of the host-initialization code should be designated as the main version in response to an instruction from the host.

5. The data storage device of claim 1, wherein the controller is further configured to determine that the copy of the host-initialization code should be designated as the main version in response to determining that the copy of the host-initialization code had been modified.

6. The data storage device of claim 1, wherein the controller is further configured to:
determine an urgency to relocate the copy of host-initialization code to the first memory; and
schedule relocation of the copy of host-initialization code to the first memory based on the urgency.

7. The data storage device of claim 6, wherein the urgency is based on a workload of the data storage device.

8. The data storage device of claim 6, wherein the urgency is based on an indication received from the host.

9. The data storage device of claim 6, wherein the urgency is based on past experience of the controller.

10. The data storage device of claim 1, wherein the second memory comprises a three-dimensional memory.

11. A method comprising:
performing the following in a data storage device comprising a storage class memory with a boot partition storing a first version of host boot code and a NAND memory with a boot partition storing a second version of the host boot code:
determining that the second version of the host boot code should be used instead of the first version of the host boot code to boot-up a host;
determining a scheduled time to move the second version of the host boot code to the storage class memory, wherein the scheduled time is based on a workload of the data storage device or on past experience of the data storage device; and
moving the second version of the host boot code to the storage class memory at the scheduled time.

12. The method of claim 11, further comprising receiving a command from the host that indicates that the second version of the host boot code should be used instead of the first version of the host boot code to boot-up the host.

13. The method of claim 11, further comprising predicting that the second version of the host boot code should be used instead of the first version of the host boot code to boot-up the host in response to a change the host makes to the second version of the host boot code.

14. The method of claim 11, wherein the scheduled time is further based on an indication received from the host.

15. The method of claim 11, wherein the scheduled time is further based on urgency.

16. The method of claim 11, wherein the moving is done as a background operation.

17. The method of claim 11, wherein the scheduled time is based on a workload of the data storage device.

18. The method of claim 11, wherein the scheduled time is based on past experience of the data storage device.

19. The method of claim 11, wherein the NAND memory comprises a three-dimensional memory.

20. A data storage device comprising:
a first memory;
a second memory, wherein the first memory has a faster access time than the second memory;
means for storing host-initialization code in the first memory, wherein by being stored in the first memory, the host-initialization code is a main version of the host-initialization code that is accessed to boot-up a host;
means for storing a copy of the host-initialization code in the second memory, wherein by being stored in the second memory, the copy of the host-initialization code is a backup version of the host-initialization code;
means for determining that the copy of the host-initialization code should be designated as the main version of the host-initialization code; and
means for relocating the copy of the host-initialization code to the first memory in response to a change the host makes to the copy of the host-initialization code in the second memory, which makes the copy of the host-initialization code the main version of the host-initialization code that is accessed to boot-up the host.

* * * * *